United States Patent Office 3,267,081
Patented August 16, 1966

3,267,081
BENZOTHIAZOLE DICARBOXYLIC ACIDS AND POLYMERS DERIVED THEREFROM
Bernard Rudner and Philip E. Brumfield, Pittsburgh, and Paul M. Hergenrother, Wampum, Pa., assignors to Koppers Company, Inc., a corporation of Delaware
No Drawing. Filed Sept. 19, 1962, Ser. No. 224,825
10 Claims. (Cl. 260—78.4)

This invention relates to heterocyclic dicarboxylic acids and to polymeric products made therefrom. In one specific aspect, it relates to a dicarboxylic acid containing a benzothiazole nucleus and to heat-stable polymers formed by the reaction of this acid and a tetraamino compound. In a further aspect, it relates to heat-stable polymers containing both benzothiazole and benzimidazole units.

The recent emphasis on space exploration has created a need for materials having greater thermal and oxidative stability. There has been a continued search for new heat-stable polymers suitable as construction materials for rocket nose cones and various other parts of space craft. We have discovered a new monomeric material, a benzothiazole dicarboxylic acid, which is suitable for making polymers having unexpectedly high thermal and oxidative stability. Our new polymers, which contain both benzothiazole and benzimidazole units, are useful in various commercial and military applications wherein thermal stability and shock resistance are particular requirements.

There are few heretofore-known polymers containing benzothiazole nuclei and none which contain both benzothiazole and benzimidazole units. Polymers containing benzothiabole units are described in Morton et al., U.S. 3,047,543. The polymers of Morton are useful in adhesive components and must be made from a critical mixture of monomeric isomers in order to obtain a suitable reaction and a polymer of the desired properties. We have not experienced this limitation in connection with the preparation of our new polymeric materials. In addition, our novel polymers, by virtue of their imidazole hydrogens, can be cross-linked at will.

It is, therefore, an object of the present invention to provide novel monomeric benzothiazole dicarboxylic acids useful for making polymers of unexpectedly high heat resistance. It is a further object ot provide novel polymers containing both benzothiazole and benzimidazole units, which are characterized by remarkable thermal, oxidative, ablative, and hydrolytic stability.

In accordance with the invention, we have discovered a dicarboxy compound of the formula:

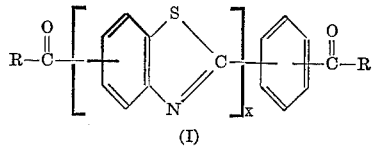

(I)

wherein $x$ is an integer having a value of 1 to 6 and R is a member selected from the group consisting of halogen, hydroxy, lower alkoxy and phenoxy. In a further embodiment of the invention, we have discovered a particularly useful polymer of the formula:

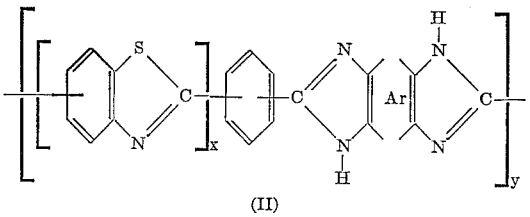

(II)

wherein Ar is an arylene radical, having from 6 to 16 carbon atoms, and two pair of whose adjacent annular carbon atoms are shared with two imidazole rings, and $x$ is an integer having a value of 1 to 6 and $y$ is an integer of at least 2. Suitable arylene radicals include phenylene, biphenylene, oxy-bis-phenylene, thio-bis-phenylene, sulfonyl-bis-phenylene and naphthylene, including the halo, lower alkoxy or lower alkyl-substituted derivatives thereof.

The polymers of the invention are made by heating the novel benzothiazole dicarboxylic acids, either as such or in the form of their obvious equivalents (acid halide, lower alkyl or phenyl esters, for example) with a tetraamino aryl compound of the formula:

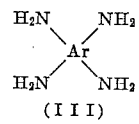

(III)

wherein Ar is as defined aforesaid, the amino groups of the arylenetetramine being attached to the aryl nucleus in pairs, the individual amino substituents of said pairs being ortho to each other, although it is not necessary for the four amino groups to be on adjacent carbon atoms.

The novel benzothiazole dicarboxylic acids of the invention are derived from the commercially available dehydrothiotoluidine or its mixed higher "benzologs" available comercially as Primuline base ($x$=2–6 in Formula IV). It has been found that the Primuline reaction can be pushed to make higher polymeric forms of dehydrothiotoluidine, thus providing other materials from which the useful diacids of the invention can be made. Thus, suitable starting materials for the preparation of the diacids have the formula:

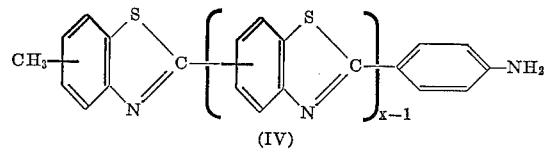

(IV)

wherein $x$ has the value given aforesaid.

Dehydrothiotoluidine or its higher condensation products can be converted to the desired 2-phenyl(benzothiazole)$_x$-4',6-dicarboxylic acid by several methods. One method comprises blocking the amino group by acetylation and subsequently oxidizing the resulting acetyl derivative, then hydrolyzing off the protective acetyl group. The deacetylated product is diazotized and the 4'-nitrile group is introduced by the Sandmeyer reaction. Hydrolysis gives the desired diacid. Another method involves diazotization of the dehydrothiotoluidine, conversion of the 4'-amino group to the 4'-nitrile group, hydrolysis to the acid and then oxidation of the 6-methyl group to form the diacid. The preferred sequence is a modification of the second method, involving the conversion of the 4'-amino group to the 4'-nitrile group, followed by a simultaneous oxidation-hydrolysis to produce the diacid.

The novel polymers of the invention are made by polymerizing the benzothiazole dicarboxylic acid with an arylene-bis-(ortho-diamine) of the formula:

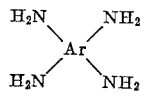

wherein Ar is as defined aforesaid and the amino groups are attached to the aryl nucleus in pairs, the individual amino substituents of said pairs being ortho to each other. Particularly useful arylenetetramines include 1,2,4,5-tetraaminobenzene,
2,3,6,7-tetraaminonaphthalene, 3,3',4,4'-tetraaminobiphenyl,
1,2,5,6-tetraaminoanthraquinone,
3,3',4,4'-tetraamino-9,9'-bifluorenylidene,
sulfonyl-bis-(2-naphthylene-7,8-diamine),
3,5-bis-(3',4'-diaminophenoxy)pyridine,
perfluorocyclohexylidene-bis-(3,4-phenylenediamine),
and the like.

Polymerization is usually accomplished by dry heating the mixed monomers at a temperature of 150–450° C. Below about 150° C. polymerization does not occur at useful rates. No advantage is seen in using temperatures above about 450° C. and at much higher temperatures, degradative side reactions occur. Polymerization can also be achieved in liquid media; for example, by heating a stirred solution or suspension in some high-boiling liquid such as mineral oil, quinaldine, or polychloronaphthalene, preferably removing the volatile condensation products (water, phenol, etc.) as rapidly as they are formed. Polymerization at lower temperatures can be achieved by use of interfacial condensation.

Polymerization is generally conducted in an inert atmosphere, e.g. under a blanket of nitrogen, argon, or hydrogen, at the required temperature. The sole purpose of this is to prevent oxidation of the frequently air-sensitive tetraamines.

Polymerization is preferably conducted at atmospheric pressure, although higher or lower pressures can be used, even in the same run, if desired. Thus, a dimeric "prepolymer" obtained by mild heating in vacuo can be "cured" to a very strong, high molecular polymer by heating under pressure while venting. This procedure is useful in compression molding.

The mole ratio of benzothiazole dicarboxylic acid to tetraamino aryl compound is preferably about 1:1, in order to obtain the highest possible yield of polymer with repeating benzothiazole and benzimidazole units. For added ability to cross-link, e.g. by formaldehyde or epoxy treatment, a minor excess of either component can be used. A 10% excess can cause a decrease in stability.

The polymers of the invention are stable to temperatures up to about 565° C. There are further characterized by excellent oxidative and hydrolytic stability. The low molecular weight products, e.g. $y=2–10$ in Structural Formula II, are useful as prepolymers. Increasingly higher molecular weight products (e.g. $y=\sim30$) become increasingly insoluble (see Example XII) and therefore are best made and used as compression moldings.

The novel dicarboxylic acids of the invention can be used to prepare a number of other polymers characterized by excellent heat stability. The reaction of the novel diacids or their derivatives with organic diamines provides polyamides somewhat similar to those disclosed and claimed in our co-pending application Serial No. 224,824, filed even date herewith. Suitable diamines for the preparation of these polymers includes ethylenediamine, propylenediamine, hexamethylenediamine, octamethylenediamine, decamethylenediamine, benzidine, and the ortho- meta- and para- position isomers of xylenediamine. The benzothiazole dicarboxylic acids are also useful intermediates in the preparation of polyesters. Excellent polyesters can be prepared by reacting the acids or their derivatives with a dihydroxy compound such as 1,4-butanediol, 1,2-propylene glycol, 1,6-hexamethylene glycol, 1,3-butanediol, ethylene glycol, resorcinol, catechol, dihydroxydiphenylsulfone, "Bis Phenol A," and the like. Polyesters thus prepared have excellent heat stability and good fiber-forming properties.

Our invention is further illustrated by the following examples:

EXAMPLE I

*2-(4'-cyanophenyl)-6-methylbenzothiazole*

A slurry of dehydrothio-p-toluidine (60.0 g., 0.25 mole) in 37% hydrochloric acid (350 ml.) and water (400 ml.) was heated to reflux with vigorous agitation for 15 minutes. The bright yellow slurry was cooled to 0° C. and sodium nitrite (18.0 g., 0.26 mole) in water (100 ml.) was added dropwise with good stirring during one hour. The cooled mixture was stirred for an additional hour, then excess nitrous acid was destroyed by the addition of urea, and the pH of the orange suspension was adjusted to 7 with sodium carbonate. The resulting yellow slurry was added during 15 minutes to a solution (at 0° C.) of cuprous cyanide (23.3 g., 0.13 mole) and sodium cyanide (38.0 g., 0.78 mole) in water (400 ml.). Benzene (100 ml.) was added to facilitate separation of the product. The resulting brown slurry was stirred at 5° C. for one hour, then permitted to warm to room temperature. The brown solid was filtered, washed with water and dried to give 69.3 g. of solid. Crystallization from isoamyl alcohol gave a light orange solid (35.0 g., 56% of theory), melting at 187–191° C. Recrystallization from isoamyl alcohol, in the presence of activated carbon, resulted in a white product, melting at 196–198° C., well above the reported value of 145° C. The infrared absorption spectrum and analytical reactions were consistent with the proposed structure for 2-(4'-cyanophenyl)-6-methylbenzothiazole.

EXAMPLE II

*2-phenyl-6-methylbenzothiazole-4'-carboxylic acid*

A suspension of 2-(4'-cyanophenyl)-6-methylbenzothiazole (9.0 g., 0.036 mole) in 37% hydrochloric acid (170 ml.) was stirred at reflux for three hours. The resulting orange suspension was cooled and poured into twice its volume of ice water. The bright orange solid separated by filtration was slurried with dilute sodium hydroxide, filtered and reslurried with hot water, then again filtered. These alkaline filtrates were combined and acidified, precipitating a tan solid. Crystallization of this tan solid from isoamyl alcohol gave the light yellow 2-phenyl-6-methylbenzothiazole-4'-carboxylic acid (5.1 g., 53% of theory) melting at 314–316° C. The infrared absorption spectrum obtained was consistent with the proposed structure.

EXAMPLE III

*2-phenylbenzothiazole-4',6'-dicarboxylic acid from 2-(4'-cyanophenyl)-6-methylbenzothiazole*

A solution of 2-(4'-cyanophenyl)-6-methylbenzothiazole (9.0 g., 0.036 mole) in 200 ml. of pyridine was added dropwise during one hour to a stirred refluxing solution of potassium permanganate (21.6 g., 0.12 mole) in 100 ml. of water and 50 ml. of pyridine. After addition of about one-half of the nitrile solution, the purple color disappeared. An additional 21.6 g. (0.12 mole) of potassium permanganate was added and the mixture was refluxed for 1.5 hours. The cooled brown mixture was filtered. The manganese dioxide filter cake contained only a trace amount of solid insoluble in aqueous bisulfite. The pyridine filtrate was concentrated and the resulting orange solid was extracted repeatedly with 2% potassium hydroxide solution. The combined alkaline filtrates were acidified with concentrated hydrochloric acid to yield 7.2 g. (67% crude yield) of orange solid. Purification by reprecipitation gave a dihydrate (calculated neutralization equivalent 168; found, 161) having an infrared absorption spectrum identical to that of an authentic sample of 2-phenylbenzothiazole-4',6-dicarboxylic acid.

EXAMPLE IV

*2-(4'-cyanophenyl)benzothiazole-6-carboxylic acid*

A suspension of 2-(4'-aminophenyl)benzothiazole-6-carboxylic acid (10.0 g., 0.037 mole) in 37% hydrochloric acid (50 ml.) and water (250 ml.) was vigorously stirred and refluxed for 15 minutes. The yellow suspension was cooled to 0° C. and sodium nitrite (2.8 g., 0.041 mole) in water (50 ml.) was added dropwise during 20 minutes. The resulting bright yellow suspension was stirred at 5° C. for 45 minutes. After the excess nitrous acid was destroyed with sulfamic acid, the pH of the yellow suspension was adjusted to 7 with sodium carbonate. The neutralized diazonium salt suspension was added during ten minutes to a clear solution of cuprous cyanide (3.4 g., 0.019 mole) and sodium cyanide (5.6 g., 0.11 mole) in water (250 ml.) cooled to 5° C. The resulting orange-brown suspension was stirred at 5° C. for two hours and at 25° C. for two hours. Saturation with sodium chloride followed by filtration gave a brown solid that was redissolved in water. The red aqueous solution was filtered and the filtrate acidified with dilute hydrochloric acid to give 8.2 g. of a brown solid (78% crude yield). The infrared absorption spectrum verified the presence of a nitrile and was consistent with the proposed structure for 2-(4'-cyanophenyl)benzothiazole-6-carboxylic acid. A portion of brown solid recrystallized from 95% ethanol was recovered as a yellow solid. The following elemental analysis was obtained.

|  | Percent C | Percent H | Percent N | Percent S | Percent Total |
|---|---|---|---|---|---|
| Calc'd. for $C_{15}H_8N_2O_2S$ | 64.27 | 2.88 | 9.58 | 11.54 | 78.27 |
| Found | 63.03 | 2.88 | 9.50 | 11.44 | 76.85 |

EXAMPLE V

*2-phenylbenzothiazole-4',6-dicarboxylic acid by hydrolysis of 2-(4'-cyanophenyl)benzothiazole - 6 - carboxylic acid*

2 - (4'-cyanophenyl)benzothiazole - 6 - carboxylic acid (8.2 g., 0.029 mole) was added to 100% phosphoric acid (139 g.) at 30° C. A slight exotherm developed during the next ten minutes, carrying the temperature to 35° C. The mixture was slowly heated to 85° C. and stirred for two hours. The resulting dark red solution was poured onto ice and filtered. Drying the filter cake at 75° C. and 15 mm. Hg gave an orange-brown liquid that was then stirred and refluxed in 10% hydrochloric acid (150 ml.) for one hour. The brown suspension was cooled to 0° C. and sodium nitrite (2.1 g., 0.03 mole) in water (50 ml.) was added dropwise during fifteen minutes. The mixture was stirred at 5° C. for one hour and at 70° C. for two hours. Filtration of the cooled mixture gave 8.8 g. (101% crude yield) of brown diacid. Purification of the brown solid was achieved by solution in 1% potassium hydroxide (400 ml.) and successive treatments of the solution three times with charcoal; acidification of the resulting yellow filtrate with dilute hydrochloric acid gave 4.0 g. of yellow solid whose neutralization equivalent was 149 (theoretical value 150). This represents a 46% yield of the dicarboxylic acid. The infrared absorption spectruc was consistent with the structure proposed for 2-phenylbenzothiazole-4',6-dicarboxylic acid. The following chemical analysis was obtained:

|  | Percent C | Percent H | Percent N | Percent S | Percent Total |
|---|---|---|---|---|---|
| Calc'd for $C_{15}H_9NO_4S$ | 60.19 | 3.03 | 4.68 | 10.71 | 78.61 |
| Found | 60.15 | 3.06 | 4.86 | 10.70 | 78.77 |

EXAMPLE VI

*Acetylation of 2'-(p-aminophenyl)-6-methyl-2,6'-bibenzothiazole*

A portion of Primuline base (IV x=2) was isolated from technical Primuline fusion mass. A solution of 2'-(p-aminophenyl)-6-methyl-2,6'-bibenzothiazole (IV x=2) (10.0 g., 0.027 mole) in 200 ml. of acetic acid was heated to reflux while acetic anhydride (4.0 g., 0.04 mole) was added during 10 minutes. After being stirred at reflux for three hours, the mixture was cooled and poured into ice water. The brown solid was collected on a filter, washed and dried. The 2'-(p-acetamidophenyl)-6-methyl-2,6'-bibenzothiazole (11.59 g., 100% yield) melted at 250–60° C.

EXAMPLE VII

*Oxidation of 2'-(p-acetamidophenyl)-6-methyl-2,6'-bibenzothiazole*

The 2'-(p-acetamidophenyl)-6-methyl-2,6'-bibenzothiazole (11.59 g., 0.027 mole) was suspended in a mixture of pyridine (180 ml.) and water (20 ml.). With vigorous stirring and with the temperature held at 57–8° C., potassium permanganate (12.6 g., 0.08 mole) in water (90 ml.) was added during one hour. After two hours at reflux, the purple color disappeared, additional permanganate (6.3 g.) was added and the mixture was refluxed for three hours more. After being cooled, the brown slurry was acidified with hydrochloric acid, treated with sodium bisulfite and filtered. The orange filter cake was slurried repeatedly with large volumes of 2% sodium hyroxide and 2% potassium hydroxide solutions. The filtered alkaline extracts, upon acidification, yielded 3.8 g. (23% crude yield) of dark orange solid, infrared absorption characteristics being consistent with the structure of 2'-(p-acetamidophenyl)-2,6'-bibenzothiazole-6-carboxylic acid. It is presumed that an appreciable amount of the acid remained as such or as a salt in the orange filter cake. The product was converted to the corresponding cyano compound by the procedure of Example IV and then to the diacid by the procedure of Example V.

EXAMPLE VIII

*Diphenyl 2-phenylbenzothiazole-4',6-dicarboxylate*

A mixture of 2-phenylbenzothiazole-4',6-dicarboxylic acid (4.73 g., 0.158 mole) and thionyl chloride (17.0 g., 0.143 mole) was refluxed for one hour. Another 17.0 g. of thionyl chloride was added and the mixture refluxed for an additional 1.5 hours. The excess thionyl chloride was removed under asiprator vacuum leaving the crude diacid chloride. Phenol (10.0 g., 0.14 mole) and the crude acid chloride residue were mixed and heated to 190° C. during one hour (a clear yellow solution formed at 80° C.). The solution was stirred at 180–190° C. until gas evolution (HCl) ceased (0.5 hour). The solution was poured into 300 ml. of 95% ethanol and the resulting yellow solid filtered; acidification of the filtrate yielded 0.8 g. of starting material. The crude, alkali washed, product melted at 209–215° C., and weighed 4.39 g. (61% crude yield). A portion of the diphenyl 2-phenylbenzothiazole - 4',6 - dicarboxylate, recrystallized from isoamyl alcohol, was white and melted at 218–220° C. The infrared absorption analysis curve was consistent with the proposed structure. The following elemental analysis was obtained.

|  | Percent C | Percent H | Percent N | Percent S | Percent Total |
|---|---|---|---|---|---|
| Calc'd. for $C_{27}H_{17}NO_4S$ | 71.82 | 3.80 | 3.10 | 7.10 | 85.82 |
| Found | 71.78 | 3.79 | 3.18 | 7.25 | 86.00 |

EXAMPLE IX

*Condensation polymerization of 3,3',4,4'-tetraaminobiphenyl and 2-phenylbenzothiazole-4',6-dicarboxylic acid*

A mixture of 2-phenylbenzothiazole-4',6-dicarboxylic acid (1.96 g., 0.0066 mole) and 3,3',4,4'-tetraaminobiphenyl (1.4 g., 0.0066 mole) was placed in a polymerization tube equipped with nitrogen inlet and outlet. The tube was immersed in a silicone oil bath preheated to 220° C. The reddish mixture immediately began to darken and melt (completely melted at 211° C.). At 226° C., condensate began to appear and slight foaming was observed. The temperature was raised to 284° C.

during three hours; condensation, darkening and foaming increased, then stopped during the last hour of heating. A sample of the product from a first heating step showed an infrared absorption curve indicating a high secondary amide content and some benzimidazole absorption. The black residue from the first heating step was ground and mixed with 0.5 g. of phosphorus pentoxide. This mixture was returned to the polymerization tube at 265° C. and heated slowly to 400° C. during two hours. The resulting black, brittle solid was slurried, then filtered, in turn with hot water, hot pyridine and ethanol. The dried black solid (3.08 g.) was insoluble and infusible.

EXAMPLE X

A sample of the polymer of Example IX, tested by thermogravimetric analysis, was found to have an "integral procedural decomposition temperature" of 565° C., by calculations according to C. D. Doyle (WADD TR60–283, May 1960). Reported values for other polymeric materials include 420° C. for nylon 66, 395° C. for polystyrene and 535° C. for polyphenyl.

A sample of the novel polymer of the invention was compared with a sample of the polybenzimidazole reported by C. S. Marvel [J. Poly. Science 50, 511 (1961)] derived from diphenyl isophthalate and 3,3-diaminobenzidine. Our polymer formed a film at 300° C. at a pressure of 8,000 p.s.i. whereas the Marvel polymer remained a powder under the same conditions.

EXAMPLE XI

*Condensation polymerization of 3,3',4,4'-tetraaminobiphenyl and biphenyl 2-phenylbenzothiazole-4',6-dicarboxylate*

A mixture of 3,3'4,4'-tetraaminobiphenyl (4.94 g., 0.023 mole) and diphenyl 2-phenylbenzothiazole-4',6-dicarboxylate (10.4 g., 0.023 mole) was heated by a silicone oil bath, under a nitrogen atmosphere. At 160° C., condensate appeared above the brown melt. At about 225° C., the brown mixture solidified; heating was continued to 300° C. for a total reaction time of seven hours. After being cooled and ground, the brown solid was examined by infrared absorption and found to have no absorption near 3α carboxamide and very weak absorption at 5.88α (C=0). The product was returned to the reaction flask and heated to a bath temperature of 400° C. during six hours under a vacuum of 0.77 Hg. The brown powder was cooled and extracted with boiling pyridine, then ethanol and vacuum dried. The product (10.7 g., 103% of theory) had an infrared absorption of a benzothiazole, with only a trace of absorption at 5.88α (C=0). A sample submitted for elemental analysis gave the following results:

|  | Percent C | Percent H | Percent N | Percent S | Percent Total |
|---|---|---|---|---|---|
| Calc'd. for $(C_{27}H_{13}N_5S)_n$ | 73.78 | 2.98 | 15.94 | 7.30 | 100.00 |
| Found | 71.15 | 3.21 | 14.09 | 7.27 | 95.72 |

EXAMPLE XII

An intimate mixture of 1.4 g. sulfonyl-bis-(3,4-phenylenediamine), as its more stable hydrochloric acid salt, and 2.3 g. diphenyl 2-phenylbenzothiazole-4',6-dicarboxylate were heated in a dry nitrogen atmosphere up to 280° C. over a period of four hours, held at this temperature four hours, then heated to 350° C. in one hour and held there an additional six hours. After four hours at 400° C., the cooled brown solid was ground to a fine powder, washed by slurrying with hot hydrochloric acid (5%), water, sodium carbonate solution (5%), water, and pyridine to yield, after vacuum drying, 2.3 g. (89.3% yield) brown polymer. The spectra and properties of the product were consistent with the proposed structure:

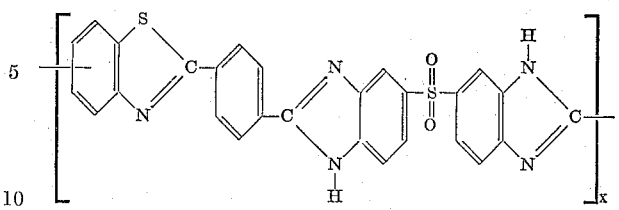

End-group titrations for primary arylamine and carboxylic acid indicated the molecular weight to be at least 13,000. The product decomposed without melting at an undetermined temperature above 500° C. It was almost insoluble in cold concentrated sulfuric acid, apparently insoluble in 90% formic acid and dimethylformamide, but slightly soluble in refluxing tetramethylene sulfone.

We claim:

1. A compound of the formula:

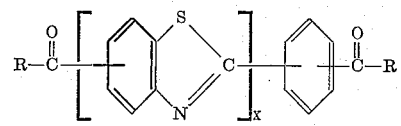

wherein x is an integer having a value of 1 to 6 and R is a member selected from the group consisting of halogen, hydroxy, lower alkoxy and phenoxy, the individual R substituents being identical.

2. A compound of claim 1 where x is 2 and R is hydroxy.

3. 2-phenylbenzothiazole-4',6-dicarboxylic acid.

4. 2-phenylbenzothiazole-4',6-dicarboxylic acid dichloride.

5. Diphenyl 2-phenylbenzothiazole-4',6-dicarboxylate.

6. A polymer of the formula:

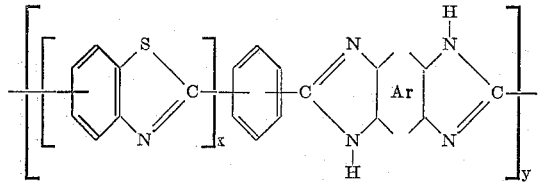

wherein Ar is an arylene radical, having from 6–16 carbon atoms and supplying two pair of adjacent annular carbon atoms to the imidazole rings, x is an integer having a value of 1–6 and y is an integer having a value of at least 2.

7. A polymer of claim 5 wherein Ar is a biphenylene radical and x is 1.

8. A polymer of claim 5 wherein Ar is a sulfonyl-bisphenylene radical and x is 1.

9. Method of making a polymer of the formula:

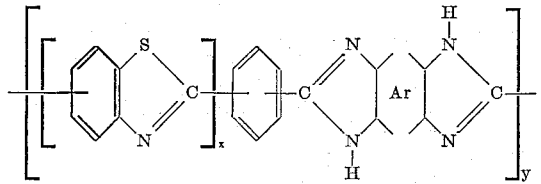

where Ar is an arylene radical, having from 6–16 carbon atoms and supplying two pair of adjacent annular carbon atoms to the imidazole rings, x is an integer having a value of 1–6 and y is an integer having a value of at least 2, comprising reacting at a temperature of 150–450° C. a compound of the formula:

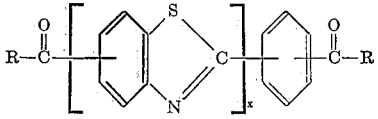

wherein x is an integer having a value of 1 to 6 and R is a member selected from the group consisting of halogen, hydroxy, lower alkoxy and phenoxy, the individual R substituents being identical with a tetraaminoaryl compound of the formula:

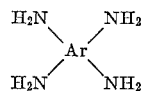

wherein Ar is as defined aforesaid, the amino groups being attached to the aryl nucleus in pairs, the individual amino substituents of said pairs being ortho to each other.

10. Method according to claim 9 wherein the reaction is conducted in an inert atmosphere.

References Cited by the Examiner
UNITED STATES PATENTS
3,047,543   7/1962   Morton et al. _____ 260—79

JOSEPH L. SCHOFER, *Primary Examiner.*
DONALD E. CZAJA, *Examiner.*